(12) United States Patent
Zhang

(10) Patent No.: US 9,346,672 B1
(45) Date of Patent: May 24, 2016

(54) METHODS FOR FABRICATING DAMASCENE WRITE POLES USING RUTHENIUM HARD MASKS

(75) Inventor: Jinqiu Zhang, Fremont, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 1703 days.

(21) Appl. No.: 12/535,645

(22) Filed: Aug. 4, 2009

(51) Int. Cl.
| | |
|---|---|
| *G11B 5/127* | (2006.01) |
| *H04R 31/00* | (2006.01) |
| *B82Y 10/00* | (2011.01) |
| *B82Y 25/00* | (2011.01) |
| *G11B 5/31* | (2006.01) |

(52) U.S. Cl.
CPC ............. *B82Y 10/00* (2013.01); *B82Y 25/00* (2013.01); *G11B 5/3163* (2013.01); *Y10T 29/49032* (2015.01); *Y10T 29/49044* (2015.01)

(58) Field of Classification Search
USPC ............ 29/603.01, 603.12, 603.07, 603.08, 29/603.13, 603.16; 360/125.03, 125.02, 360/125.12, 125.38
See application file for complete search history.

(56) References Cited

U.S. PATENT DOCUMENTS

| | | | |
|---|---|---|---|
| 4,671,849 A | 6/1987 | Chen et al. | |
| 5,075,956 A | 12/1991 | Das | |
| 5,664,316 A | 9/1997 | Chen et al. | |
| 6,172,848 B1 | 1/2001 | Santini | |
| 6,261,967 B1 | 7/2001 | Athavale et al. | |
| 6,369,984 B1 * | 4/2002 | Sato | 360/125.43 |
| 6,564,445 B1 | 5/2003 | Hashimoto et al. | |
| 6,722,018 B2 | 4/2004 | Santini | |
| 6,731,460 B2 | 5/2004 | Sasaki | |
| 6,762,911 B2 | 7/2004 | Sasaki et al. | |
| 6,783,874 B2 * | 8/2004 | Hasegawa et al. | 428/811.2 |
| 6,813,116 B2 | 11/2004 | Nakamura et al. | |
| 6,857,181 B2 | 2/2005 | Lo et al. | |
| 6,862,798 B2 | 3/2005 | Kruger et al. | |
| 6,870,712 B2 | 3/2005 | Chen et al. | |
| 6,891,697 B2 | 5/2005 | Nakamura et al. | |
| 6,903,900 B2 | 6/2005 | Sato et al. | |
| 6,912,106 B1 | 6/2005 | Chen et al. | |
| 6,947,255 B2 | 9/2005 | Hsiao et al. | |
| 6,949,833 B2 | 9/2005 | O'Kane et al. | |
| 6,950,277 B1 | 9/2005 | Nguy et al. | |
| 6,952,325 B2 | 10/2005 | Sato et al. | |
| 6,975,486 B2 | 12/2005 | Chen et al. | |
| 6,989,972 B1 | 1/2006 | Stoev et al. | |
| 6,995,949 B2 | 2/2006 | Nakamura et al. | |
| 7,006,326 B2 | 2/2006 | Okada et al. | |
| 7,070,698 B2 | 7/2006 | Le | |
| 7,100,266 B2 | 9/2006 | Plumer et al. | |

(Continued)

FOREIGN PATENT DOCUMENTS

EP 0823726 A1 2/1998

*Primary Examiner* — Peter DungBa Vo
*Assistant Examiner* — Jeffrey T Carley

(57) ABSTRACT

A method for forming a write pole comprises the steps of providing a structure comprising a substrate layer, a ruthenium layer over the substrate layer, and a tantalum layer over the ruthenium layer, providing an opening in the tantalum layer over a portion of the ruthenium layer, performing a first reactive ion etching step on the portion of the ruthenium layer under the opening in the tantalum layer to provide an opening in the ruthenium layer over a portion of the substrate layer, performing a second reactive ion etching step on the portion of the substrate layer under the opening in the ruthenium layer to form a damascene trench therein, and filling the damascene trench with a magnetic material to form the write pole.

17 Claims, 8 Drawing Sheets

(56) References Cited

U.S. PATENT DOCUMENTS

| | | |
|---|---|---|
| 7,108,796 B2 | 9/2006 | Bergevin et al. |
| 7,120,988 B2 | 10/2006 | Le et al. |
| 7,133,252 B2 | 11/2006 | Takano et al. |
| 7,139,153 B2 | 11/2006 | Hsiao et al. |
| 7,185,415 B2 | 3/2007 | Khera et al. |
| 7,194,798 B2 | 3/2007 | Bonhote et al. |
| 7,212,379 B2 | 5/2007 | Hsu et al. |
| 7,251,878 B2 | 8/2007 | Le et al. |
| 7,253,992 B2 | 8/2007 | Chen et al. |
| 7,265,942 B2 | 9/2007 | Hixson-Goldsmith et al. |
| 7,296,338 B2 | 11/2007 | Le et al. |
| 7,324,304 B1 | 1/2008 | Benakli et al. |
| 7,349,247 B2 | 3/2008 | Saito |
| 7,369,359 B2 | 5/2008 | Fujita et al. |
| 7,381,343 B2 | 6/2008 | Gaidis et al. |
| 7,392,577 B2 | 7/2008 | Yazawa et al. |
| 7,430,095 B2 | 9/2008 | Benakli et al. |
| 7,441,325 B2 | 10/2008 | Gao et al. |
| 7,444,740 B1 | 11/2008 | Chung et al. |
| 7,464,457 B2 | 12/2008 | Le et al. |
| 7,469,467 B2 | 12/2008 | Gao et al. |
| 7,777,987 B2 | 8/2010 | Guan et al. |
| 8,125,732 B2 | 2/2012 | Bai et al. |
| 8,196,285 B1 | 6/2012 | Zhang et al. |
| 8,225,488 B1 | 7/2012 | Zhang et al. |
| 8,254,060 B1 | 8/2012 | Shi et al. |
| 2002/0093761 A1 | 7/2002 | Payne et al. |
| 2003/0151850 A1 | 8/2003 | Nakamura et al. |
| 2004/0061988 A1 | 4/2004 | Matono et al. |
| 2004/0239320 A1 | 12/2004 | Kobayashi et al. |
| 2005/0066517 A1 | 3/2005 | Bedell et al. |
| 2005/0269288 A1 | 12/2005 | Cyrille et al. |
| 2006/0174474 A1 | 8/2006 | Le |
| 2006/0198049 A1 | 9/2006 | Sasaki et al. |
| 2006/0225268 A1 | 10/2006 | Le et al. |
| 2006/0288565 A1 | 12/2006 | Le et al. |
| 2007/0113395 A1 | 5/2007 | Dulay et al. |
| 2007/0137028 A1 | 6/2007 | Carey et al. |
| 2007/0177301 A1* | 8/2007 | Han et al. .................. 360/126 |
| 2007/0188918 A1 | 8/2007 | Im et al. |
| 2007/0211380 A1 | 9/2007 | Akimoto et al. |
| 2007/0236834 A1 | 10/2007 | Toma et al. |
| 2007/0245544 A1 | 10/2007 | Allen et al. |
| 2007/0247746 A1 | 10/2007 | Kim et al. |
| 2007/0258167 A1 | 11/2007 | Allen et al. |
| 2007/0263324 A1 | 11/2007 | Allen et al. |
| 2007/0283557 A1 | 12/2007 | Chen et al. |
| 2008/0002293 A1 | 1/2008 | Sasaki et al. |
| 2008/0002309 A1 | 1/2008 | Hsu et al. |
| 2008/0110761 A1 | 5/2008 | Lam et al. |
| 2008/0113514 A1 | 5/2008 | Baer et al. |
| 2008/0151437 A1 | 6/2008 | Chen et al. |
| 2008/0297945 A1 | 12/2008 | Han et al. |
| 2008/0316653 A1 | 12/2008 | Sasaki et al. |
| 2009/0116145 A1 | 5/2009 | Guan et al. |
| 2009/0268344 A1 | 10/2009 | Guan et al. |
| 2009/0279207 A1 | 11/2009 | Sasaki et al. |
| 2010/0112486 A1 | 5/2010 | Zhang et al. |
| 2010/0277832 A1 | 11/2010 | Bai et al. |
| 2011/0222188 A1 | 9/2011 | Etoh et al. |

* cited by examiner

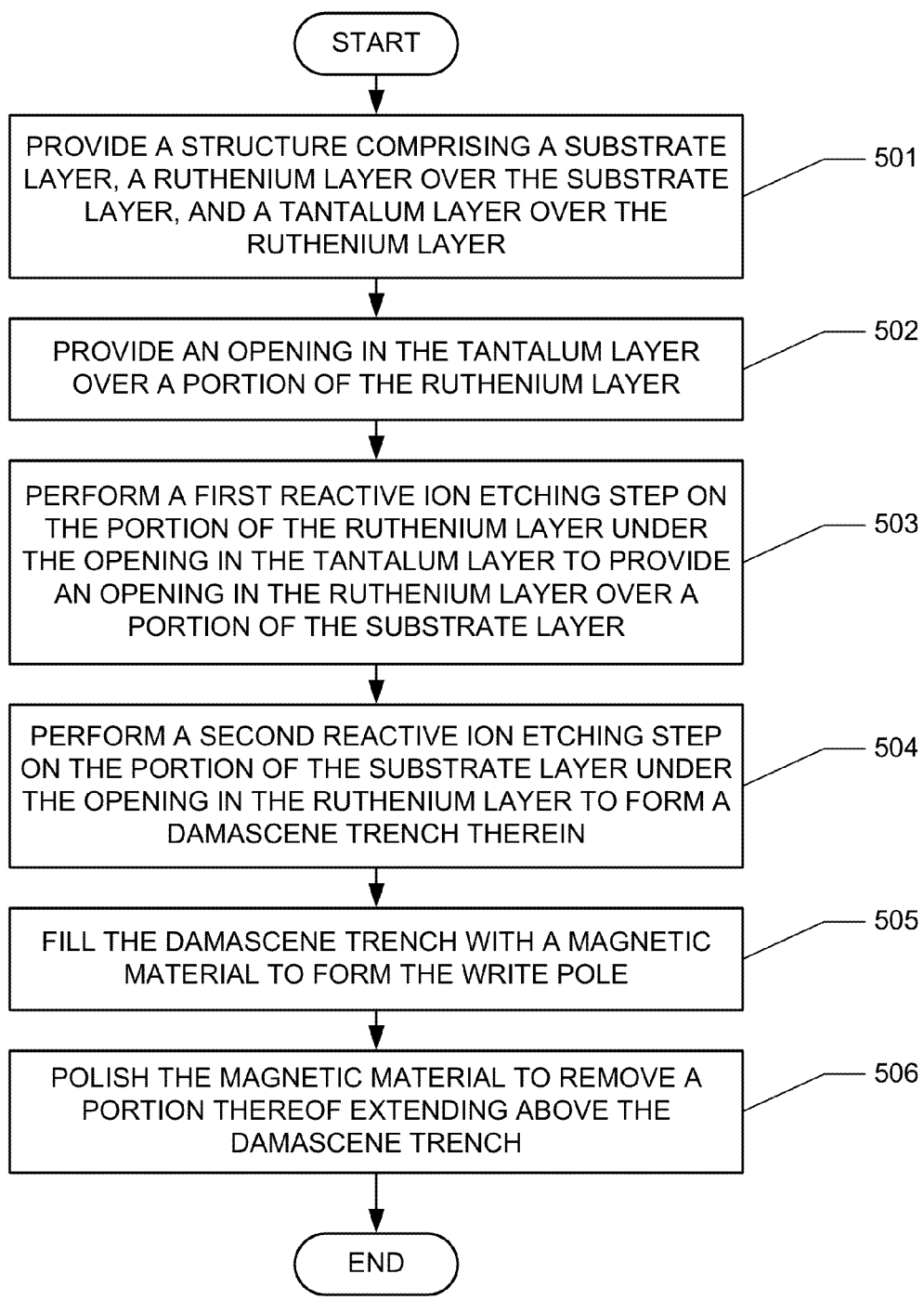

METHODS FOR FABRICATING DAMASCENE WRITE POLES USING RUTHENIUM HARD MASKS

FIELD OF THE INVENTION

The present invention generally relates to hard disk drives and, in particular, relates to ruthenium hard masks for fabricating damascene write poles.

BACKGROUND OF THE INVENTION

Hard disk drives include one or more rigid disks, which are coated with a magnetic recording medium in which data can be stored. Hard disk drives further include read and write heads for interacting with the data in the magnetic recording medium. The write head includes an inductive element for generating a magnetic field that aligns the magnetic moments of domains in the magnetic recording medium to represent bits of data.

Magnetic recording techniques include both longitudinal and perpendicular recording. Perpendicular magnetic recording ("PMR") is a form of magnetic recording in which the magnetic moments representing bits of data are oriented perpendicularly to the surface of the magnetic recording medium, as opposed to longitudinally along a track thereof. PMR enjoys a number of advantages over longitudinal recording, such as significantly higher areal density recording capability.

Write poles with a trapezoidal cross-sectional shape at the air bearing surface ("ABS") are used to provide improved writing performance in PMR heads. The manufacture of write poles with this trapezoidal cross-sectional shape presents a number of difficulties, however. One approach to manufacturing such poles involves a reductive process of milling poles from a layer of magnetic material. Due to the complex three-dimensional shapes called for in next-generation hard disk drives, however, this process can be extraordinarily difficult and prone to low yields. Another approach to manufacturing these poles involves an additive process, in which damascene trenches are formed in an insulating substrate layer and filled with a magnetic material. The success of this process relies upon the formation of a properly dimensioned and shaped damascene trench.

One approach to forming a damascene trench involves providing a hard mask with an opening over a region of insulating substrate and removing the portion of the substrate below the opening. For example, as shown in FIG. 1a, a hard mask with two layer 105 and 104 (e.g., of Cr and Ru or NiFe) may be provided over an iso-line of photoresist 107 and a bar layer 106 (e.g., of nitride). The hard mask covers a layer of insulating substrate 102 (e.g., $Al_2O_3$) and, optionally, a secondary mask layer 103 (e.g., of Ta). The insulating substrate 102 may itself be provided over a lower substrate layer, such as, for example, NiCr. The iso-line of photoresist 107 is provided over a region of insulating substrate 102 in a region where a damascene trench will be formed. By side-milling the structure illustrated in FIG. 1a, the portion of the hard mask layers 105 and 104 covering photoresist 107 can be removed, and by removing photoresist 107 and bar layer 106 via lift-off, a patterned hard mask with an opening 108 is formed over the substrate 102, as is shown in FIG. 1b. When this structure is subjected to a reactive ion etching (RIE) operation, the pattern opening 108 is transferred to insulating substrate 102, forming a damascene trench 109, as is shown in FIG. 1c.

This process of side-milling an opening in a hard mask suffers from a number of drawbacks. For example, if NiFe is used as a hard mask material, the subsequent removal of excess NiFe from the structure (which is necessitated by NiFe's magnetic properties) requires wet-etching, which can adversely impact the shape and dimensions of the damascene trench. Ru may make a better material for the hard mask, giving the RIE selectivity between Ru and $Al_2O_3$ (i.e., in an RIE operation in the presence of chlorine gas used to form a damascene trench in an $Al_2O_3$ layer protected by a Ru hard mask, the Ru will etch at a much slower rate than the $Al_2O_3$), but the process of forming the hard mask via side-milling and lift-off may still leave the Ru hard mask layer with fencing (i.e., the upward-thrusting hard mask material left over following side-milling and lift-off, illustrated in FIG. 1b, which can adversely impact the critical dimension and/or side wall angle of the damascene trench. Moreover, the milling process may roughen the upper surface of the hard mask material, which can reduce the effectiveness and/or predictability of a subsequent chemical-mechanical polishing (CMP) step used to remove the mask layer. Finally, the processes of side-milling and lift-off require a different process chamber than does the process of RIE, increasing the complexity of the foregoing hard mask formation method.

SUMMARY OF THE INVENTION

Various embodiments of the present invention solve the foregoing problems by providing methods for forming a Ru hard mask layer via a reactive ion etching (RIE) process. Forming the Ru hard mask via RIE leaves no fencing around the resultant damascene trench, leaves the surface of the Ru layer smooth enough to serve as a reliable CMP stop layer, and allows a single process chamber to be used both for the formation of the hard mask and for the subsequent RIE step used to form the damascene trench.

According to one embodiment of the subject disclosure, a method for forming a write pole comprises the steps of providing a structure comprising a substrate layer, a ruthenium layer over the substrate layer, and a tantalum layer over the ruthenium layer, providing an opening in the tantalum layer over a portion of the ruthenium layer, performing a first reactive ion etching step on the portion of the ruthenium layer under the opening in the tantalum layer to provide an opening in the ruthenium layer over a portion of the substrate layer, performing a second reactive ion etching step on the portion of the substrate layer under the opening in the ruthenium layer to form a damascene trench therein, and filling the damascene trench with a magnetic material to form the write pole.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 5 is a flow chart illustrating a method for forming a write pole in accordance with one aspect of the subject disclosure.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Ru makes an excellent choice for a hard mask material when reactive ion etching (RIE) alumina. In this regard, $Al_2O_3$ etches between 25 and 30 times faster than Ru when exposed to a chlorine (Cl) gas RIE process. When exposed an RIE operation in the presence of Cl and oxygen (O), however, Ru can be preferentially etched faster than either $Al_2O_3$ or Ta. In this regard, in the presence of a mixture of Cl and O gases, Ru may preferentially be etched between 60 and 70 times faster than Ta, and more than 50 times faster than $Al_2O_3$. This etching propensity of Ru in the presence of Cl and O can be exploited to create a Ru hard mask for the formation of a damascene write pole, as is set forth in greater detail below.

Figure 1A:
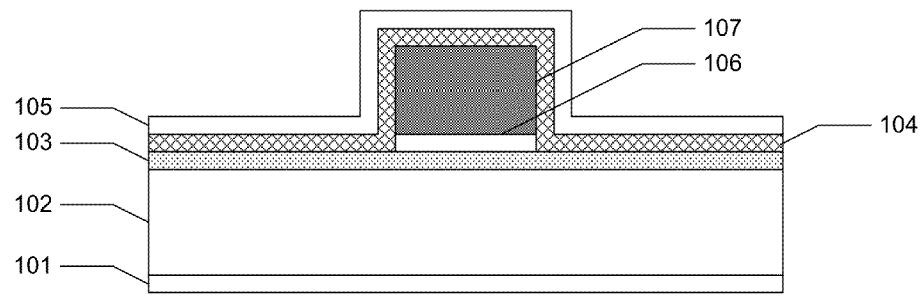
FIGS. 1a-1c illustrate structures formed after various steps in the formation of a damascene trench via a side-milling and lift-off process.
Figure 1B:
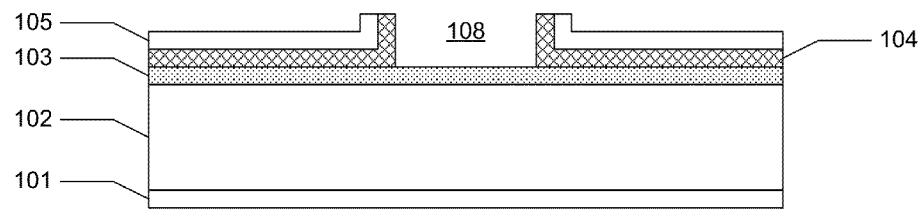
Figure 1C:
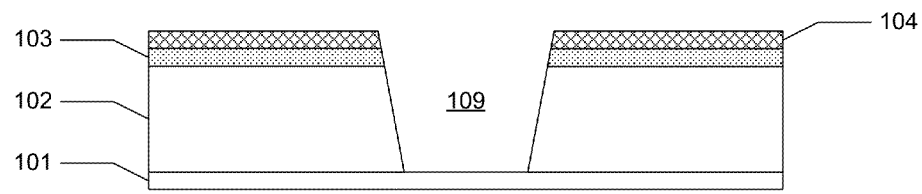
Figure 2A:
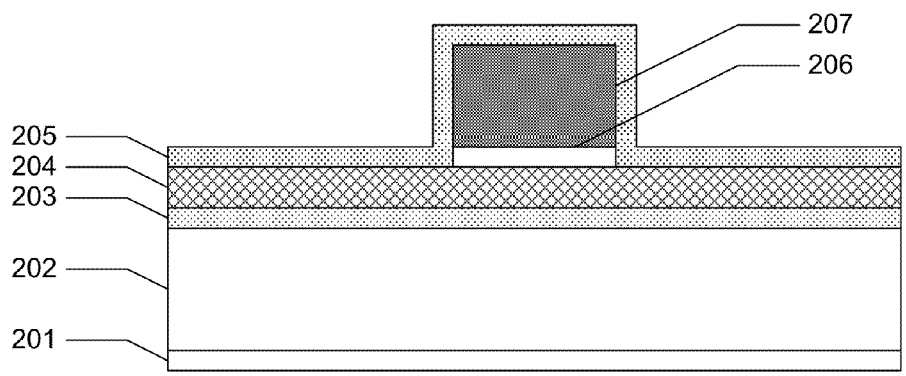
FIGS. 2a-2f illustrate structures formed after various steps in the formation of a damascene trench in accordance with one aspect of the subject disclosure.

FIGS. 2a to 2f illustrate various structures formed after various steps in the formation of a damascene trench in accordance with one aspect of the subject disclosure. In FIG. 2a, a layer of insulating substrate 202 (e.g., $Al_2O_3$) in which a damascene trench is to be formed is provided over a lower substrate 201 (e.g., NiCr). Above the insulating substrate 202 is provided a lower mask layer 203 of a material which is resistant to RIE in the presence of both Cl and O gases (e.g., Ta). Over lower mask layer 203 is provided a primary mask layer 204 of Ru. An iso line of photoresist 207 and a bar layer 206 (e.g., of nitride) is provided over the Ru primary mask layer 204 in a region where the damascene trench is to be formed. Over this iso-line of photoresist 207 and over the primary mask layer 204 is provided an upper mask layer 205 of material which is resistant to RIE in the presence of both Cl and O gases (e.g., Ta).

Figure 2B:
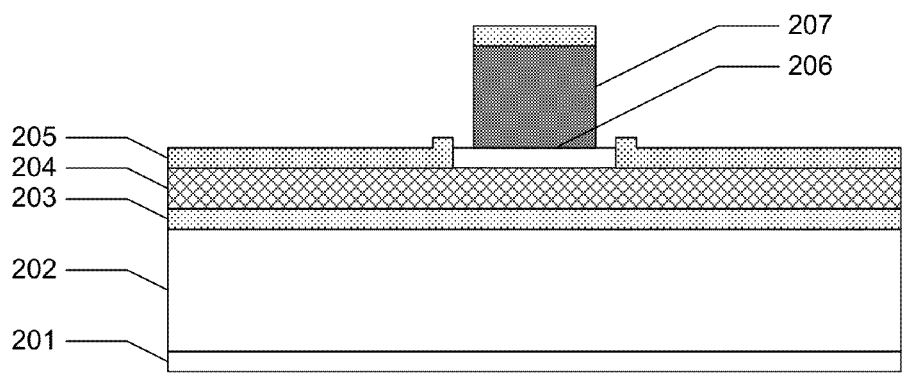
Figure 2C:
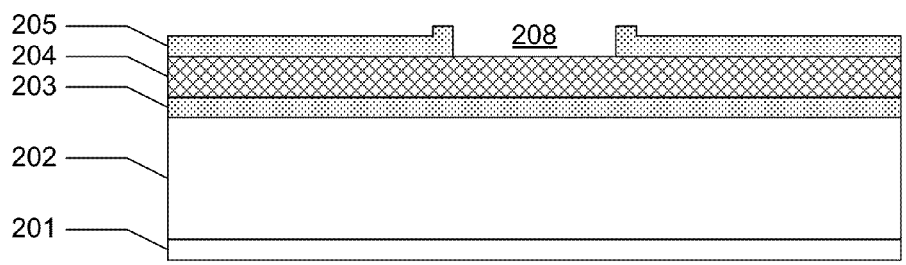

To define an opening in the upper mask layer 205, a side-milling operation is performed to remove a portion of the upper mask layer 205 on either side of the iso-line of photoresist. The result of this operation is illustrated in FIG. 2b, in accordance with one aspect of the subject disclosure. Following the side-milling operation, a lift-off operation is performed to remove the iso-line of photoresist 207 and bar layer 206, leaving opening 208 in the upper mask layer 205, as is illustrated in FIG. 2c, in accordance with one aspect of the subject disclosure.

Figure 2D:
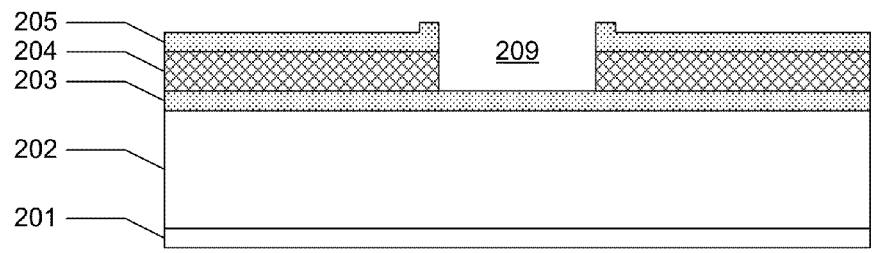

Next, an RIE operation in the presence of a mixture of Cl and O gases is performed to transfer the pattern of opening 208 into Ru primary hard mask layer 204, forming an opening 209 therein, as is shown in FIG. 2d, in accordance with one aspect of the subject disclosure. The lower mask layer 203, which comprises a material selected for its resistance to an RIE operation with such a mixture of Cl and O gases, is thereby exposed, while the upper mask layer 205, which similarly comprises a material selected for its resistance to an RIE operation with such a mixture of Cl and O gases, is left largely intact, preventing the removal of any Ru except below opening 208.

Figure 2E:
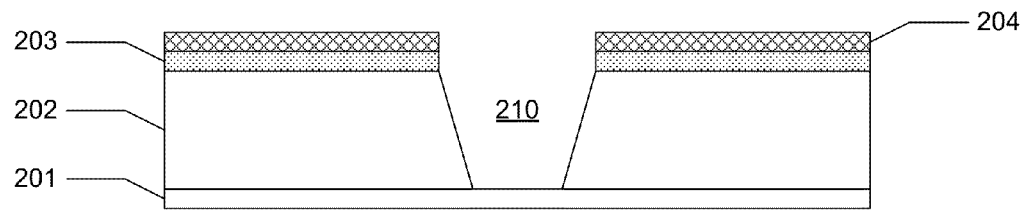

To form a damascene trench in insulating substrate 202, another RIE operation is performed with Cl gas. As set forth in greater detail above, Ru is far more resistant to such an RIE operation than either Ta or $Al_2O_3$, allowing Ru to function as a hard mask and to transfer the pattern of opening 209 into a damascene trench 210 in insulating substrate 202, as is shown in FIG. 2e, in accordance with one aspect of the subject disclosure. As can also be seen with reference to FIG. 2e, a portion of Ru primary mask layer 204 may be removed during this RIE operation, so the thickness of the Ru primary mask layer 204 may be chosen to endure the duration of the operation. For example, to form a damascene trench in an $Al_2O_3$ layer between 3000 and 4000 Å thick, a Ru primary hard mask layer may be between 400 and 1000 Å thick.

Figure 2F:
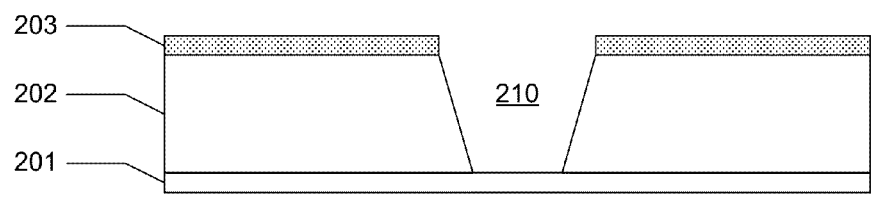

After the formation of damascene trench 210, the remainder of Ru primary hard mask layer 204 may be removed by another RIE operation using a mixture of Cl and O gases. As previously indicated, in the presence of such a gas, an RIE operation may remove Ru much more quickly than either Ta or $Al_2O_3$ are removed, such that the lower mask layer 203 and insulating substrate 202 may be largely unaffected by this operation, as is illustrated in FIG. 2f, in accordance with one aspect of the subject disclosure.

Figure 3A:
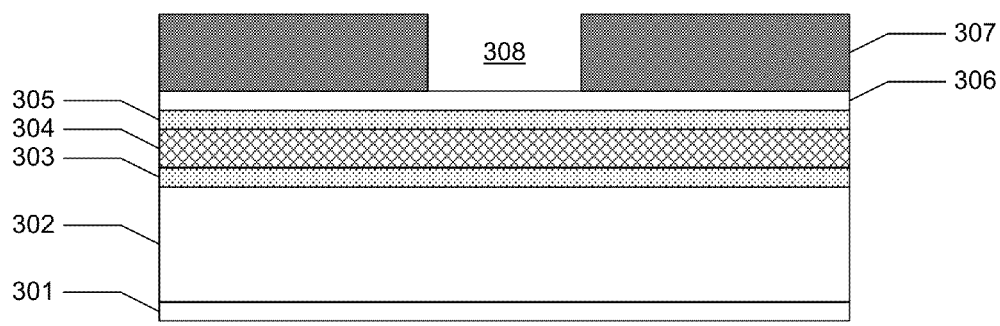
FIGS. 3a-3i illustrate structures formed after various steps in the formation of a write pole in accordance with one aspect of the subject disclosure.
Figure 3B:
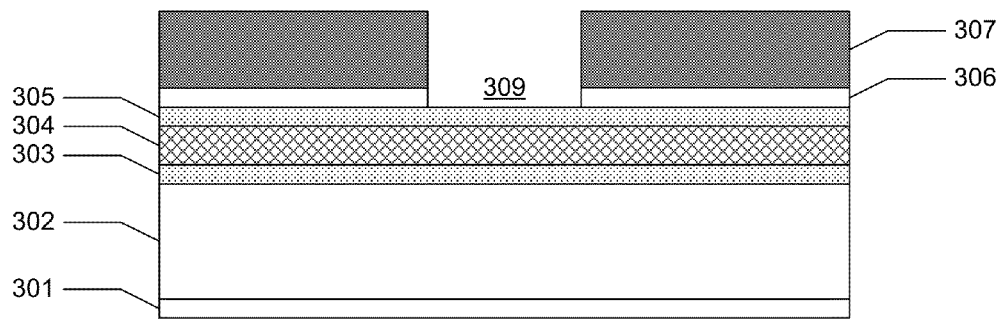

Turning to FIG. 3a, another approach to forming a damascene trench in a substrate layer is illustrated in accordance with one aspect of the subject disclosure. This approach is similar to that illustrated above with respect to FIGS. 2a-2f, except that an opening in the upper hard mask layer is formed not via side-milling and lift-off, but via reactive ion etching. In this regard, FIG. 3a illustrates a structure in which a layer of insulating substrate 302 (e.g., $Al_2O_3$) in which a damascene trench is to be formed is provided over a lower substrate 301 (e.g., NiCr). Above the insulating substrate 302 is provided a lower mask layer 303 of a material which is resistant to RIE in the presence of both Cl and O gases (e.g., Ta). Over lower mask layer 303 is provided a primary mask layer 304 of Ru. Over this primary mask layer 304 is provided an upper mask layer 305 of material which is resistant to RIE in the presence of both Cl and O gases (e.g., Ta). Above the upper mask layer 305 is provided a bar layer 306 (e.g., of nitride) over which a patterned photoresist layer 307 is provided. The patterned photoresist layer 307 includes an opening over the bar layer 306 in a region where the damascene trench is to be formed. The portion of bar layer 306 exposed by opening 308 is removed via an RIE operation using gaseous oxygen, providing an opening 309 therein, as is illustrated in FIG. 3b in accordance with one aspect of the subject disclosure.

Figure 3C:
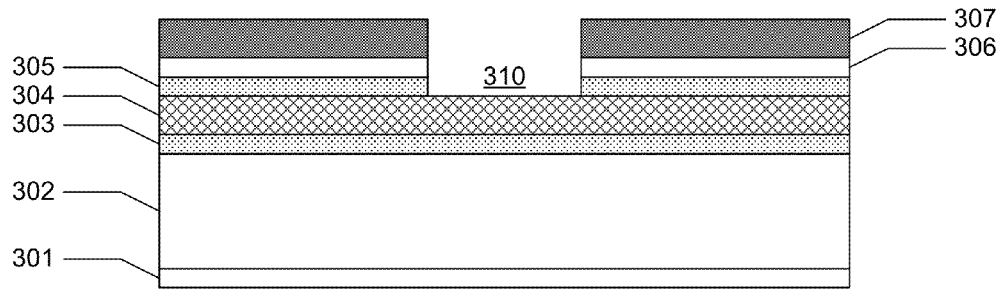
Figure 3D:
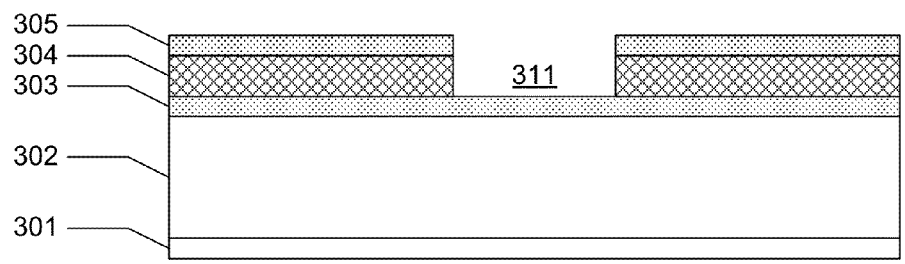

The pattern of opening 309 is transferred to upper mask layer 305 by performing an RIE operation in the presence of Cl gas. This creates an opening 310 in upper mask layer 305, as is illustrated in FIG. 3c in accordance with one aspect of the subject disclosure. Primary mask layer 304, being comprised of Ru, is resistant to such an RIE operation, and is therefor exposed by opening 310 but not removed. Next, an RIE operation in the presence of a mixture of Cl and O gases is performed to transfer the pattern of opening 310 into Ru primary hard mask layer 304, forming an opening 311 therein, as is shown in FIG. 3d, in accordance with one aspect of the subject disclosure. The lower mask layer 303, which comprises a material selected for its resistance to an RIE operation with such a mixture of Cl and O gases, is thereby exposed, while the upper mask layer 305, which similarly comprises a material selected for its resistance to an RIE operation with such a mixture of Cl and O gases, is left largely intact, preventing the removal of any Ru except below opening 310. This RIE operation may remove photoresist layer 307 and bar layer 306, as can be seen with reference to FIG. 3d.

Figure 3E:
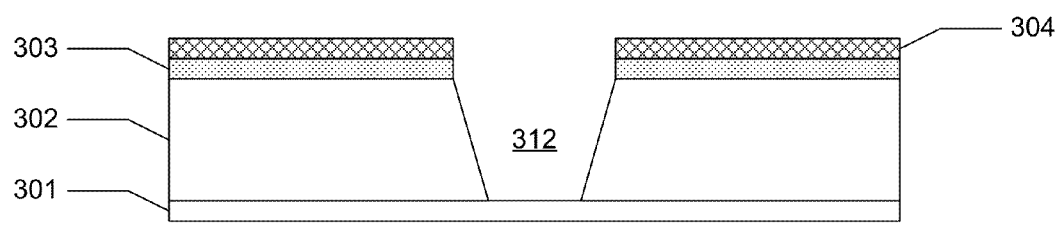
Figure 3F:
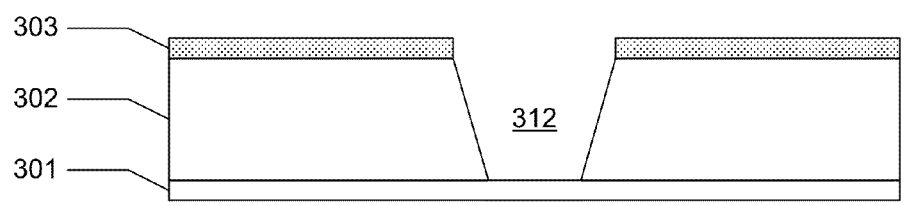

To form a damascene trench in insulating substrate 302, another RIE operation is performed with Cl gas. As set forth in greater detail above, Ru is far more resistant to such an RIE operation than either Ta or $Al_2O_3$, allowing Ru to function as a hard mask and to transfer the pattern of opening 311 into a damascene trench 312 in insulating substrate 302, as is shown in FIG. 3e, in accordance with one aspect of the subject disclosure. As can also be seen with reference to FIG. 3e, a portion of Ru primary mask layer 304 may be removed during this RIE operation. After the formation of damascene trench 312, the remainder of Ru primary hard mask layer 204 may be removed by another RIE operation using a mixture of Cl and O gases. As previously indicated, in the presence of such a gas, an RIE operation may remove Ru much more quickly than either Ta or $Al_2O_3$ are removed, such that the lower mask layer 303 and insulating substrate 302 may be largely unaffected by this operation, as is illustrated in FIG. 3f, in accordance with one aspect of the subject disclosure. The damascene trench 312 of FIG. 3f, which is substantially similar to the damascene trench 210 of FIG. 2f, can now be used to form a PMR write pole, as is shown in FIGS. 3g-3i, in accordance with one aspect of the subject disclosure.

Figure 3G:
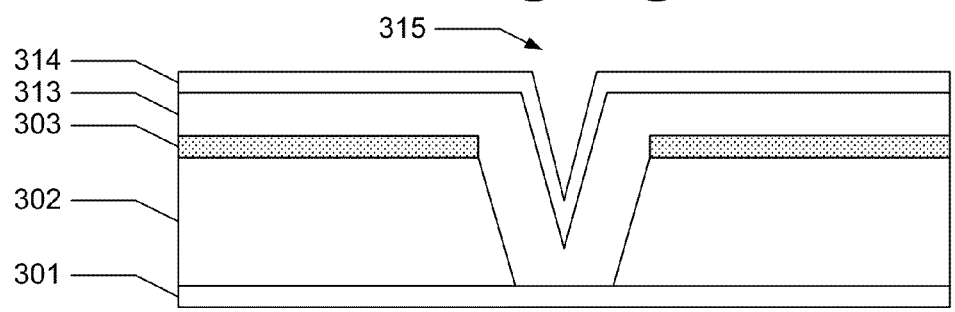
Figure 3H:
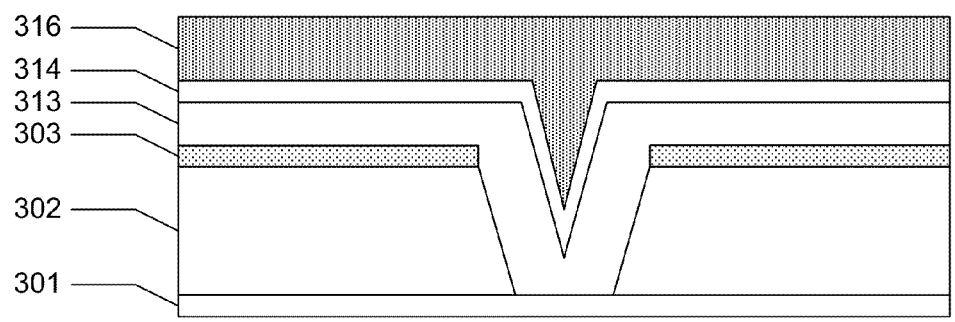
Figure 3I:
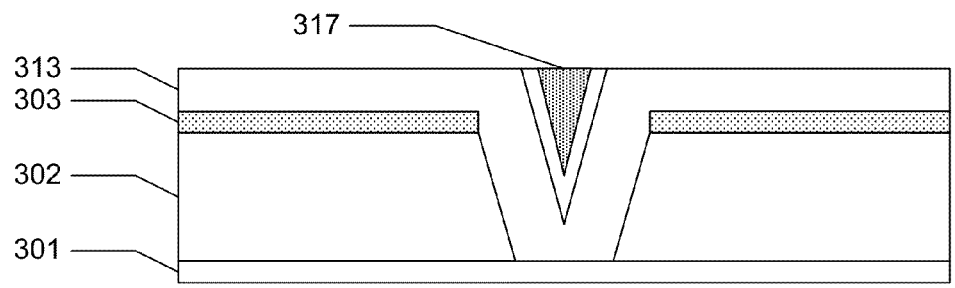

After forming a damascene trench, such as damascene trench 210 or damascene trench 312, a layer of insulating material 313 (e.g., $Al_2O_3$) may be disposed therein (e.g., by ALD over the entire wafer in which the damascene trench is formed) to adjust the critical dimension and side wall profile of the trench, as is shown in FIG. 3g, in accordance with one aspect of the subject disclosure. Over the layer of insulating material 313 may further be disposed a seed layer 314 (e.g., of a magnetic material such as Ru, Au, NiFe, CoNiFe, or any other metal layer suitable for plating). Seed layer 314 may be used to further adjust the critical dimension and side wall profile of the trench 315. Over seed layer 314, a layer of magnetic material 316 (e.g., CoNiFe, CoFe, or the like) may be electroplated. Magnetic material 316 fills damascene trench 315 and covers seed layer 314, as shown in FIG. 3h, in accordance with one aspect of the subject disclosure. Following the electroplating of magnetic material 316, a polishing process, such as chemical-mechanical polishing (CMP) may be performed to remove the magnetic material extending above the layer of insulating material 313 and seed layer 314, leaving a triangular or trapezoidal cross-sectional write pole 317 of the magnetic material.

Figure 4:
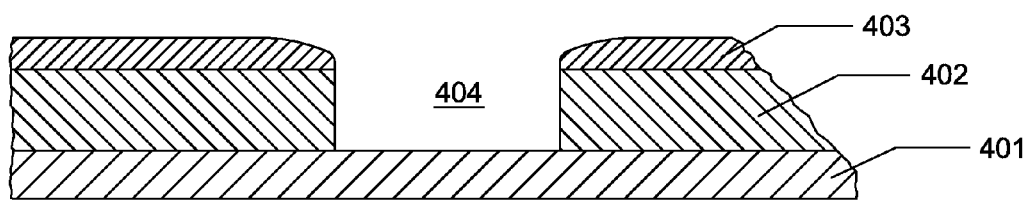
FIG. 4 is a scanning electron microscope image of a hard mask in accordance with one aspect of the subject disclosure.

FIG. 4 is a scanning electron microscope image of a Ru primary hard mask formed via RIE in accordance with one aspect of the subject disclosure. As can be seen with reference to FIG. 4, the Ru hard mask 402 has well defined vertical walls on either side of opening 404. As can be further seen with reference to FIG. 4, the Ta upper mask layer 403 and Ta lower mask layer 401, being much more resistant to RIE in the presence of a mixture of Cl and O gases than Ru, demonstrate very little etching as a result of the operation.

FIG. 5 is flowchart illustrating a method for forming a write pole in accordance with one aspect of the subject disclosure. In step 501, a structure comprising a substrate layer, a ruthenium layer over the substrate layer, and a tantalum layer over the ruthenium layer is provided. In step 502, an opening is provided in the tantalum layer over a portion of the ruthenium layer. In step 503, a first reactive ion etching step is performed on the portion of the ruthenium layer under the opening in the tantalum layer to provide an opening in the ruthenium layer over a portion of the substrate layer. In step 504, a second reactive ion etching step is performed on the portion of the substrate layer under the opening in the ruthenium layer to form a damascene trench therein. In step 505, the damascene trench is filled with a magnetic material to form the write pole. In step 506, the magnetic material is polished to remove a portion thereof extending above the damascene trench.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for forming a write pole, comprising the steps of:
    providing a structure comprising a substrate layer, a ruthenium layer over the substrate layer, and a tantalum layer over the ruthenium layer;
    providing an opening in the tantalum layer over a portion of the ruthenium layer;
    performing a first reactive ion etching step on the portion of the ruthenium layer under the opening in the tantalum layer to provide an opening in the ruthenium layer over a portion of the substrate layer;
    performing a second reactive ion etching step on the portion of the substrate layer under the opening in the ruthenium layer to form a damascene trench therein; and
    filling the damascene trench with a magnetic material to form the write pole.

2. The method according to claim 1, wherein the first reactive ion etching step comprises reactive ion etching with a first gas comprising both chlorine (Cl) and oxygen (O).

3. The method according to claim 1, wherein the second reactive ion etching step comprises reactive ion etching with a second gas comprising chlorine (Cl).

4. The method according to claim 1, wherein the opening in the tantalum layer is provided by:
    forming a photoresist pattern over the tantalum layer, the photoresist pattern including an opening over a portion of the tantalum layer, and performing a third reactive ion etching step on the portion of the tantalum layer under the opening in the photoresist pattern to provide the opening in the tantalum layer.

5. The method according to claim 4, wherein the third reactive ion etching step comprises reactive ion etching with a third gas comprising Cl.

6. The method according to claim 4, wherein the photoresist pattern comprises a layer of photoresist material in which the opening is disposed, and a bar layer disposed between the layer of photoresist material and the tantalum layer.

7. The method according to claim 6, wherein the bar layer comprises a nitride.

8. The method according to claim 1, wherein the opening in the tantalum layer is provided by:
    forming a photoresist pattern over the ruthenium layer, the photoresist pattern including a region of photoresist over the portion of the ruthenium layer,
    disposing the tantalum layer over the photoresist pattern; and
    etching the tantalum layer to remove both a portion of the tantalum layer over the region of photoresist and the region of photoresist.

9. The method according to claim 8, wherein the photoresist pattern comprises an iso-line of photoresist material comprising the region of photoresist, and a bar layer disposed between the iso-line of photoresist material and the tantalum layer.

10. The method according to claim 9, further comprising etching an exposed portion of the bar layer before disposing the tantalum layer over the photoresist pattern.

11. The method according to claim 1, wherein the substrate layer comprises alumina.

12. The method according to claim 1, wherein the structure further comprises a stop layer under the substrate layer.

13. The method according to claim 12, wherein the stop layer comprises NiCr, Cr or Ru.

14. The method according to claim 1, wherein the structure further comprises a second layer of tantalum between the substrate layer and the ruthenium layer, and wherein the second reactive ion etching step provides an opening in the second tantalum layer under the opening in the ruthenium layer.

15. The method according to claim 1, wherein the step of filling the damascene trench with the magnetic material comprises electroplating the magnetic material.

16. The method according to claim 1, further comprising the step of polishing the magnetic material to remove a portion thereof extending above the damascene trench.

17. The method according to claim 16, wherein the polishing is stopped upon reaching the ruthenium layer.

* * * * *